US009755761B2

(12) United States Patent
Zhang et al.

(10) Patent No.: US 9,755,761 B2
(45) Date of Patent: Sep. 5, 2017

(54) HITLESS, MULTI-RATE OPTICAL TRANSMISSION AND RECEPTION

(71) Applicant: Huawei Technologies Co., Ltd., Shenzhen, Guangdong (CN)

(72) Inventors: Zhuhong Zhang, Ottawa (CA); Chuandong Li, Ottawa (CA)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 15/342,832

(22) Filed: Nov. 3, 2016

(65) Prior Publication Data

US 2017/0078028 A1 Mar. 16, 2017

Related U.S. Application Data

(62) Division of application No. 14/512,753, filed on Oct. 13, 2014, now Pat. No. 9,520,941.

(51) Int. Cl.
*H04B 10/00* (2013.01)
*H04B 10/61* (2013.01)
*H04B 10/25* (2013.01)
*H04B 10/079* (2013.01)
(Continued)

(52) U.S. Cl.
CPC ....... *H04B 10/616* (2013.01); *H04B 10/0795* (2013.01); *H04B 10/25* (2013.01); *H04B 10/5161* (2013.01); *H04B 10/61* (2013.01); *H04J 14/06* (2013.01)

(58) Field of Classification Search
CPC .... H04B 10/25; H04B 10/0795; H04B 10/61; H04L 27/04; H04L 27/18
See application file for complete search history.

(56) References Cited

U.S. PATENT DOCUMENTS 5,960,028 A * 9/1999 Okamoto ............... H04B 1/707
375/130
2008/0259921 A1* 10/2008 Nadarajah ........... H04L 12/1836
370/390

(Continued)

OTHER PUBLICATIONS

Teipen, B., et al., "Adaptive Data Rates for Flexible Transceivers in Optical Networks," Journal of Networks, vol. 7, No. 5, May 2012, pp. 776-782.

(Continued)

*Primary Examiner* — Dzung Tran
(74) *Attorney, Agent, or Firm* — Conley Rose, P.C.

(57) ABSTRACT

An apparatus comprising a receiver configured to receive an optical signal that carries a multi-rate data signal associated with a first transmission data rate and a second transmission data rate. The apparatus further comprises a processor configured to convert the optical signal into a plurality of digital electrical signals, decode a first portion of the digital electrical signals according to a first modulation format associated with the first transmission data rate, detect a rate change signaling block in the digital electrical signals that indicates a rate change from the first transmission data rate to the second transmission data rate associated with a second modulation format, and decode a second portion of the digital electrical signals received after the rate change signaling block according to the second modulation format.

20 Claims, 7 Drawing Sheets

(51) Int. Cl.
*H04B 10/516* (2013.01)
*H04J 14/06* (2006.01)

(56) References Cited

U.S. PATENT DOCUMENTS

2009/0097442 A1\* 4/2009 Diab ................. H04L 12/40136
370/329
2009/0154491 A1 6/2009 Diab
2014/0036667 A1\* 2/2014 Balasubramanian H04W 28/0231
370/230

OTHER PUBLICATIONS

Gho, G., et al., "Rate-Adaptive Modulation and Low-Density Parity-Check Coding for Optical Fiber Transmission Systems," Journal of Optical Communication Network, vol. 4, No. 10, Oct. 2012, 9 pages.
Roberts, K., et al., "Flexible Transceivers," 2012 38th European Conference and Exhibition on Optical Communications (ECOC) Technical Digest, We.3.A.3.pdf, 2012, 3 pages.
Foreign Communication From A Counterpart Application, PCT Application No. PCT/US2015/055223, International Search Report dated Jan. 19, 2016, 5 pages.
Foreign Communication From A Counterpart Application, PCT Application No. PCT/US2015/055223, Written Opinion dated Jan. 19, 2016, 8 pages.
Office Action dated Jun. 15, 2016, 14 pages, U.S. Appl. No. 14/512,753, filed Oct. 13, 2014.
Office Action dated Apr. 1, 2016, 52 pages, U.S. Appl. No. 14/512,753, filed Oct. 13, 2014.
Notice of Allowance dated Sep. 23, 2016, 5 pages, U.S. Appl. No. 14/512,753, filed Oct. 13, 2014.

\* cited by examiner

HITLESS, MULTI-RATE OPTICAL TRANSMISSION AND RECEPTION

CROSS-REFERENCE TO RELATED APPLICATIONS

This application is a divisional application of U.S. patent application Ser. No. 14/512,753 filed on Oct. 13, 2014 by Zhuhong Zhang and Chuandong Li and titled "Hitless, Multi-Rate Optical Transmission And Reception," which is incorporated by reference in its entirety.

STATEMENT REGARDING FEDERALLY SPONSORED RESEARCH OR DEVELOPMENT

Not applicable.

REFERENCE TO A MICROFICHE APPENDIX

Not applicable.

BACKGROUND

Optical communication systems are widely used for data communication. An optical communication system may comprise an optical transmitter, a channel (e.g., optical fibers), and an optical receiver. The optical transmitter may encode data onto an optical signal, the channel may carry the optical signal from the transmitter to the receiver, and the receiver may recover the data from the received optical signal. Optical access networks are currently employed for delivering a wide variety of high-throughput data and services, such as fiber to the home (FTTH), fiber to the building (FTTB), enterprise connectivity, business connectivity, and mobile back-haul and front-haul for fourth generation (4G) and/or next generation wireless communication. The growing demand for increased optical network capacities poses challenges to current and future network designs. In order to achieve high capacity communications in the limited spectral bandwidth, recent research has focused on increasing spectral efficiency by employing higher order modulation schemes, such as polarization-multiplexed binary phase-shift keying (PM-BPSK), polarization-multiplexed quadrature phase-shift keying (PM-QPSK), polarization-multiplexed 8 quadrature amplitude modulation (PM-8QAM), or polarization-multiplexed 16 QAM (PM-16QAM), to provide data rates greater than 20 gigabits per second (Gbps). In addition, the optical network industry is driving towards flexible and adaptive networks to provide cost-effective solutions, in which the networks and/or network equipment may be reconfigurable or software programmable, similar to the approach of software defined radios (SDRs) in wireless communication, and may adapt to changes in application demands and traffic conditions.

SUMMARY

In one embodiment, the disclosure includes an apparatus comprising a processing unit configured to encode a data sequence in a plurality of modulation formats to produce a multi-rate data stream, wherein a first of the modulation formats provides a first transmission data rate, and wherein a second of the modulation formats provides a second transmission data rate different from the first transmission data rate, and insert a rate change signaling block into the multi-rate data stream to indicate a rate change from the first transmission data rate to the second transmission data rate, and a frontend coupled to the processing unit and configured to convert the multi-rate data stream into an optical signal, and transmit the converted optical signal towards a remote optical receiver via an optical network.

In another embodiment, the disclosure includes a method for use in an optical communication device comprising encoding a first portion of a data sequence according to a first modulation format that provides a first transmission data rate, generating rate change signaling information to indicate a rate change from the first transmission data rate to a second transmission data rate different from the first transmission data rate, wherein the second transmission data rate is provided by a second modulation format different from the first modulation format, encoding a second portion of the data sequence in a third modulation format to provide a continuous data transmission during the rate change, encoding a third portion of the data sequence according to the second modulation format, generating an optical signal based on the first portion, the rate change signaling information, the second portion, and the third portion, and transmitting the generated optical signal towards an optical receiver via an optical network.

In yet another embodiment, the disclosure includes a coherent optical receiver comprising a frontend configured to receive an optical signal that carries a multi-rate data signal comprising a first transmission data rate and a second transmission data rate, and convert the optical signal into one or more digital electrical signals, and a processing unit coupled to the frontend and configured to decode a first portion of the digital electrical signals according to a first modulation format associated with the first transmission data rate, detect a rate change signaling block in the digital electrical signals that indicates a rate change from the first transmission data rate to the second transmission data rate associated with a second modulation format, and decode a second portion of the digital electrical signals received after the rate change signaling block according to the second modulation format.

These and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

It should be understood at the outset that, although an illustrative implementation of one or more embodiments are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalent.

Disclosed herein are embodiments of a multi-rate optical transceiver for providing hitless rate changes in an optical communication system. Hitless rate change refers to seamlessly changing a transmission data rate and signaling rate change information with continuous data transmissions (e.g., the transceiver does not have to stop sending or receiving data to change the data rate), no loss of data, and no loss of bandwidth. The disclosed embodiments are suitable for generating multi-rate signals based on quadrature amplitude modulation (QAM), where different transmission data rates are provided by varying the modulation order. At the transmitter, the multi-rate optical transceiver employs a transmit (Tx) rate controller to determine and adjust the transmitter output transmission data rate, for example, to match to an input data rate, which may vary based on the applications or the services in delivery. For example, the transmitter determines to change the transmission data rate of a data stream from a first transmission data rate to a second transmission data rate, where the first transmission data rate is provided by a first modulation format and the second transmission data rate is provided by a second modulation format. To signal the rate change, the Tx rate controller generates rate change signaling information and embeds the rate change signaling information in the data stream for transmission. In order to account for the bandwidth used for carrying the rate change signaling information and to provide a continuous data transmission, the Tx rate controller adjusts the encoding of the data during the rate switch. At the receiver, the multi-rate optical transceiver employs a receive (Rx) rate detector and an Rx rate controller to monitor a received signal for rate change signaling information and instructs the receiver to perform demodulation accordingly. The disclosed embodiments provide a robust coding scheme for rate change signaling information based on redundancy coding. The disclosed embodiments are suitable for use in flexible and adaptive coherent optical networks. In a coherent optical network, receivers may perform coherent detection to recover amplitude and phase information from the received optical signals.

Figure 1:
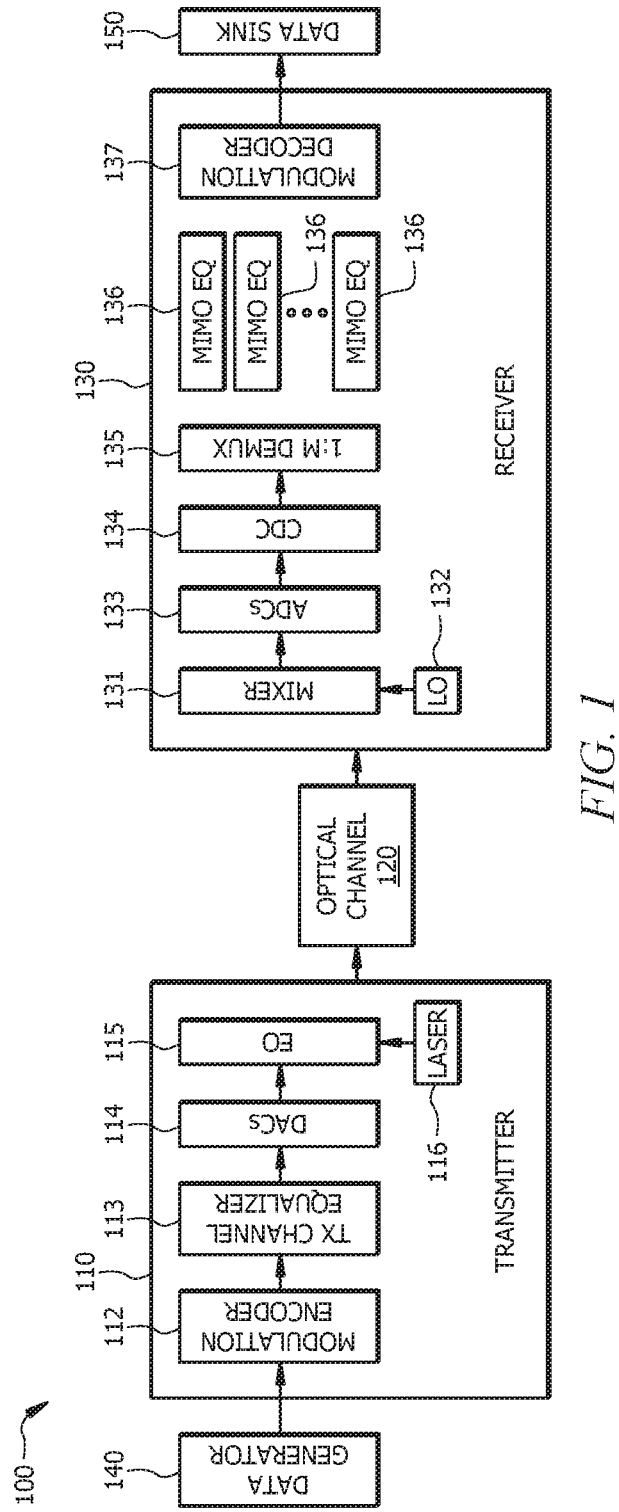
FIG. 1 is a schematic diagram of an optical transportation link.

FIG. 1 is a schematic diagram of an embodiment of an optical transportation link 100. The optical transportation link 100 comprises a transmitter 110 communicatively coupled to a coherent receiver 130 through an optical channel 120. The transmitter 110 is located on a transmitting side of the optical transportation link 100 and is configured to send optical signals to the receiver 130 located on a receiving side of the optical transportation link 100 via the channel 120. The channel 120 represents a transmission link in an optical communication network and carries upstream and/or downstream transmission signals between a central office (CO) and a customer-premises equipment (CPE). For example, the transmitter 110 may reside at the CO and the receiver 130 may reside at the CPE for downstream transmission, whereas for upstream transmission, the transmitter 110 may reside at the CPE and the receiver 130 may reside at the CO. In order to facilitate bi-directional data communication, an optical transceiver at a CO and/or a CPE comprises both the transmitter 110 and the receiver 130.

The transmitter 110 comprises a modulation encoder 112, a Tx channel equalizer 113, one or more digital-to-analog converters (DACs) 114, an electrical-to-optical (E/O) converter 115, and a laser 116. The transmitter 110 receives an input data stream, for example, from a data generator 140, which may be part of an application or service delivery system. The laser 116 may be a light-emitting source, such as a tunable laser, a colorless laser, distributed Bragg reflector (DBR) laser.

The modulation encoder 112 is configured to map the input data stream into data symbols according to a modulation scheme to produce encoded digital signals. Some examples of modulation schemes may include PM-BPSK, PM-QPSK, PM-8QAM, and PM-16QAM. The modulation encoder 112 is coupled to the Tx channel equalizer 113.

The Tx channel equalizer 113 is configured to perform spectral shaping and/or Tx pre-compensation on the encoded digital signals, for example, to account for signal distortions that may occur during transmission over the channel 1201 and produces pre-compensated digital signals. The DACs 114 are coupled to the Tx channel equalizer 113 and are configured to convert the pre-compensated digital signals into analog electrical signals.

The E/O converter 115 is coupled to the DACs 114. The E/O converter 115 comprises E/O components (not shown) and is configured to modulate the analog electrical signals onto an optical carrier provided by the laser 116. For example, the transmitter 110 may transmit an optical signal comprising two orthogonal linear-polarization components, an X-polarization component and a Y-polarization component, each comprising two orthogonal phase components, an in-phase (I) component and a quadrature-phase (Q) component. Both polarization components may comprise the same optical carrier frequency, which corresponds to an optical wavelength supplied by the laser 116.

It should be noted that the modulation encoder 112 and the Tx channel equalizer 113 are suitable for implementing in a processing unit that comprises general processors, single-core processors, multi-core processors, application-specific integrated circuits (ASICs), and/or digital signal processors (DSPs). The E/O converter 115, the laser 116, and the DACs 114 are referred to as the frontend of the transmitter 110.

The channel 120 comprises optical filters, such as cascaded wavelength-selective switches (WSSs), fiber, amplifiers, and other components (not shown). The channel 120 may be the source of chromatic dispersion (CD), nonlinear phase noise, polarization mode dispersion (PMD), polarization dependent loss (PDL), polarization dependent gain, polarization rotation, and optical white Gaussian noise. The fibers may be single-mode optical fibers or multi-mode optical fibers.

The receiver 130 is configured to perform coherent detection. Coherent detection refers to the recovery of amplitude and phase information from a received optical carrier signal. The receiver 130 comprises a mixer 131, a local oscillator (LO) 132, one or more (analog to digital converters) ADCs 133, a CD compensator (CDC) 134, a 1:M de-multiplexer (DEMUX) 135, a plurality of multiple-input multiple-output equalizers (MIMO EQs) 136, and a modulation decoder 137. The receiver 130 is configured to receive an optical signal transmitted by the transmitter 110 and propagated through the channel 120.

The mixer 131 is configured to convert the received optical signal into one or more electrical signals. The LO 132 is a light source configured to provide an optical signal that comprises a frequency closely matching the laser 116 at the transmitter 110, where the optical signal is referred to as the reference signal. The mixer 131 is configured to mix the reference signal with the propagated optical signal and split the propagated optical signal into four analog electrical signals with each split signal being a mixture of the transmitted signal. For example, the analog electrical signals may comprise an I component and a Q component for each X-polarization component and Y-polarization component. The ADCs 133 are coupled to the mixer 131 and configured to convert the analog electrical signals into digital signals. It should be noted that the mixer 131, the LO 132, and the ADCs 133 are referred to as the frontend of the receiver 130.

The CDC 134 is coupled to the ADCs 133 and is configured to perform CD compensation on the digital signals to produce CD compensated digital signals. The 1:M DEMUX 135 is coupled to the CDC 134 and is configured to de-multiplex the CD compensated digital signals into M branches, where M is a positive integer number. For example, the value M may be specific to a hardware implementation and may be dependent on the hardware processing clock speed.

In the receiver 130, the MIMO EQs 136 are coupled to the 1:M DEMUX 135 and are arranged in a parallel configuration. Each MIMO EQ 136 is configured to process one of the M branches to recover and track polarization state variations, compensate PMD, track carrier frequency and phase, and recover the carrier frequency and phase. For example, each MIMO EQ 136 may comprise two inputs and two outputs. It should be noted that the MIMO EQs 136 are configured for parallel processing in the receiver 130, but the 1:M DEMUX 135 and the MIMO EQs 136 may be alternatively configured as determined by a person of ordinary skill in the art to achieve the same functionalities.

The modulation decoder 137 is coupled to the MIMO EQs 136 and is configured to perform hard slicing or soft slicing to recover the original transmitted data. After slicing, the modulation decoder 137 provides the recovered data to a data sink 150, which may be part of an application or service delivery system in communication with the data generator 140. It should be noted that the MIMO EQs 136 and the modulation decoder 137 are suitable for implementation in a processing unit substantially similar to the processing unit described in the transmitter 110.

An optical transceiver comprising an optical transmitter, such as the transmitter 110, and an optical coherent receiver, such as the receiver 120, may be capable of transmitting data at multiple data rates. For example, the optical transceiver may vary the data rate by changing the modulation scheme or the modulation order, but maintaining the same baud rate. The modulation order of a modulation scheme refers to the number of information bits that are transmitted per data symbol by employing the modulation scheme. The baud rate refers to the symbol rate or the modulation rate in symbols per second, whereas the data rate refers to the bit rate and varies with the modulation format and/or the modulation order. For example, an optical transceiver may operate at a fixed baud rate of about 28 gigabauds per second (GBaud), but may vary the modulation format from PM-BPSK to PM-QPSK to produce a data stream that switches from 50 Gbps to 100 Gbps, or from PM-QPSK to PM-16QAM to switch the transmission data rate from 100 Gbps to 200 Gbps. However, such an optical transceiver may not be equipped with rate change controlling mechanisms to provide hitless rate changes. For example, the transmitter in such an optical transceiver may not provide any rate change information and the receiver in such an optical transceiver may not be provided with information about the rate switching time and the modulation format change. As such, the transmission may not be continuous during the rate switch.

Figure 2:
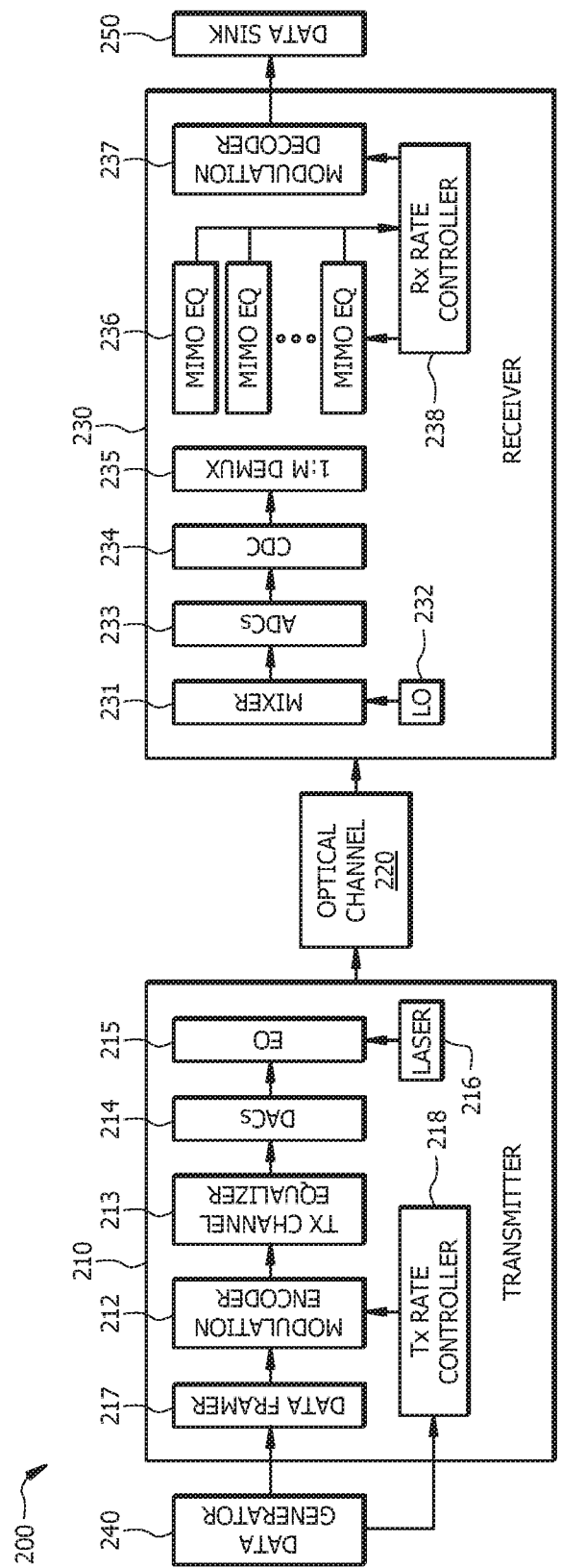
FIG. 2 is a schematic diagram of an optical transportation link that supports hitless rate changes according to an embodiment of the disclosure.

FIG. 2 is a schematic diagram of an optical transportation link 200 that supports hitless rate changes according to an embodiment of the disclosure. The optical transportation link 200 comprises a transmitter 210 communicatively coupled to a coherent receiver 230 through an optical channel 220. The channel 220 is substantially similar to the channel 120. As shown, the optical transportation link 200 comprises a similar configuration as in the optical transportation link 100, where the transmitter 210 is located on a transmitting side of the optical transportation link 200 and the receiver 230 is located on a receiving side of the optical transportation link 200. The transmitter 210 and the receiver 230 are substantially similar to the transmitter 110 and the receiver 130, respectively, but both the transmitter 210 and the receiver 230 comprise additional modules for signaling, detecting, and controlling rate changes to provide hitless rate changes.

The transmitter 210 comprises a modulation encoder 212, a Tx channel equalizer 213, one or more DACs 214, an E/O converter 215, a laser 216, a data framer 217, and a Tx rate controller 218. The modulation encoder 212, the Tx channel equalizer 213, the DACs 214, the E/O converter 215, and the laser 216 are similar to the modulation encoder 112, the Tx channel equalizer 113, the DACs 114, the E/O converter 115, and the laser 116, respectively. The transmitter 210 is configured to receive an input data stream from a data generator 240, similar to the data generator 140.

The data framer 217 is configured to receive an input data stream carrying data information bits from the data generator 240. The data framer 217 is further configured to partition the input data stream into a plurality of data blocks to match a processing clock speed and arrange the data blocks according to a modulation scheme. For example, for a PM-QPSK modulation scheme, the data framer 217 may group data bits in groups of 8, where every 2 data bits are mapped to a data symbol for an I component in an X-polarization, a Q component in the X-polarization, an I component in a Y-polarization, or a Q component in the Y-polarization. The number of groups may be dependent on the hardware implementation, as described more fully below.

The Tx rate controller 218 is coupled to the modulation encoder 212 and the data generator 240. The Tx rate controller 218 monitors the input data rate, which is the rate at which the data generator 240 is producing the input data stream. As the input data rate increases or decreases, for example, over some period of time, the Tx rate controller 218 determines a more suitable transmission data rate. When the Tx rate controller 218 determines to switch from a first transmission data rate to a second transmission data rate, the Tx rate controller 218 determines a modulation format that leads to the second transmission data rate, generates rate change signaling information, for example, by providing a modulation format change, and instructs the modulation encoder 212 to encode the input data stream with the updated modulation format. It should be noted that the input data rate is a raw data bit rate, whereas the transmission data rate is the transmitter 210 output data rate, which may include physical layer coding redundancies or other physical layer transmission overheads.

The transmitter 210 transmits the rate change signaling information along with the data stream to the receiver 230. For example, the transmitter 210 may insert the rate change signaling information at some period of time prior to the rate switching time to provide a sufficient amount of time for the receiver 230 to detect the rate change signaling information and to configure the receiver 230 such that no data loss occurs at the receiver during the switching time.

In addition to signaling the rate change, the Tx rate controller 218 instructs the modulation encoder 212 to encode some data blocks at a higher order modulation format to account for the bandwidth used for carrying the rate change signaling information and to provide a continuous data transmission. For example, when the Tx rate controller 218 determines to switch to a higher transmission data rate at a particular switching time, the Tx rate controller 218 may instruct the modulation encoder 212 to combine and encode some data blocks with the higher order modulation format that provides the higher data rate before the switching time. Conversely, when the Tx rate controller 218 determines to switch to a lower transmission data rate at a particular switching time, the Tx rate controller 218 may instruct the modulation encoder 212 to combine and encode some data blocks with the same higher order modulation format after the switching time. The number of data blocks that are combined and encoded with the higher order modulation format may vary and may depend on the amount of rate change, for exampling, about two data blocks may be sufficient to increase or decrease the transmit data rate by about two.

The receiver 230 comprises a mixer 231, an LO 232, one or more ADCs 233, a CDC 234, a 1:M DEMUX 235, a plurality of MIMO EQs 236, a modulation decoder 237, and an Rx rate controller 238. The mixer 231, the LO 232, the ADCs 233, the CDC 234, the 1:M DEMUX 235, the MIMO EQs 236, and the modulation decoder 237 are substantially similar to the mixer 131, the LO 132, the ADCs 133, the CDC 134, the 1:M DEMUX 135, the MIMO EQs 136, and the modulation decoder 137. The Rx rate controller 238 is coupled to the MIMO EQs 236 and the modulation decoder 237. The Rx rate controller 238 is configured to monitor the output of the MIMO EQs 236 for the presence of the rate change signaling information and to control the equalizations at the MIMO EQs 236 and data encodings at the modulation decoder 237 based on the detected rate change signaling information. For example, upon detection of the rate change signaling information, the Rx rate controller 238 may configure the MIMO EQs 236 and the modulation decoder 237 to provision for the rate change with no loss of data. The recovered data is provided to a data sink 250, similar to the data sink 150. It should be noted that the rate change signaling information terminates at the receiver 230 and the rate change signaling information is transparent to the data sink 250.

Figure 3:
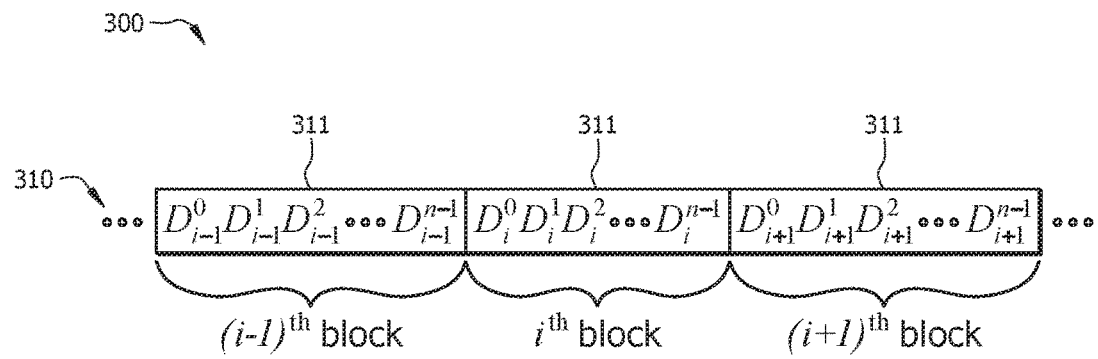
FIG. 3 is a schematic diagram of an embodiment of a data partitioning scheme.

FIG. 3 is a schematic diagram of an embodiment of a data partitioning scheme 300, which is employed by an optical transmitter, such as the transmitter 200, to provide multi-rate transmission with hitless rate changes. In the scheme 300, a data sequence 310 is partitioned into a plurality of data blocks 311, each comprising a plurality of data symbols encoded with the same modulation format. In FIG. 3, the data symbols in the i−1$^{th}$ data block 311 are represented as $D_{i-1}^0$ to D the data symbols in the i$^{th}$ data block 311 are represented as $D_i^0$ to $D_i^{n-1}$ and the data symbols in the i+1$^{th}$ data block 311 are represented as $D_{i+1}^0$ to $D_{i+1}^{n-1}$. The size of the data symbols and/or the number of components in a data symbol are dependent on the modulation format. For example, for polarization-multiplexed quadrature amplitude modulation (PM-QAM), each data symbol may comprise four components, an I component and a Q component in an X-polarization, and an I component and a Q component in a Y-polarization.

The number of symbols $N_s$ in a data block 311 is selected to achieve a particular throughput for a particular hardware implementation. The value $N_s$ is dependent on the symbol rate, the hardware architecture, and the hardware processing clock speed. The value $N_s$ is computed as follows:

$$N_s = \frac{R_B}{R_P \times M}, \quad (1)$$

where $R_B$ is the symbol rate, $R_P$ is the hardware processing clock speed, and M is the number of parallel branches supported in the hardware implementation. For example, the hardware may be configured to modulate and produce M data symbols in one clock cycle.

When employing PM-QAM, the number of coded data bits, $N_d$, in a data block 311 is computed as follows:

$$N_d = 2 \times N_{QAM} \times N_s, \quad (2)$$

where $N_{QAM}$ is the size of a QAM data symbol, for example, $N_{QAM}$ may be four for 16QAM.

Figure 4:
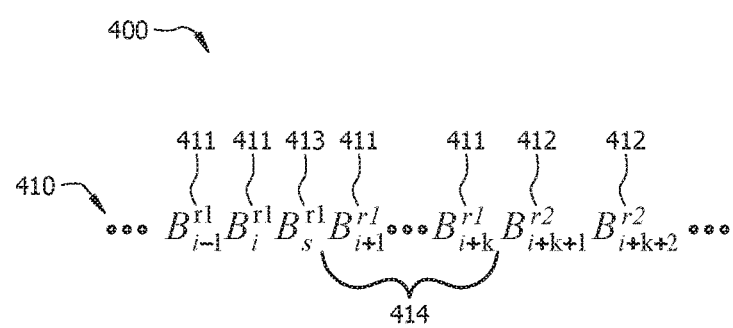
FIG. 4 is a schematic diagram of an embodiment of a rate change signaling scheme.

FIG. 4 is a schematic diagram of an embodiment of a rate change signaling scheme 400, which is employed by an optical transmitter, such as the transmitter 200, to provide multi-rate transmission with hitless rate changes. In the scheme 400, a transmission sequence 410 comprises a plurality of data blocks 411 and 412, similar to the data blocks 311, and a rate change signaling block 413. The data blocks 411 are encoded in a first modulation format that provides a first transmission data rate, $r^1$. The data blocks 412 are encoded in a second modulation format that provides a second transmission data rate, $r^2$. For example, the i$^{th}$ data block 411 encoded for the first transmission data rate is denoted as $B_i^{r^1}$ and the i+k+1$^{th}$ data block 412 encoded for the second transmission data rate is denoted as $B_{i+k+1}^{r^2}$.

To signal a rate change, the rate change signaling block 413, denoted as $B_s^{r^1}$, is encoded in the same first modulation format that provides the first transmission data rate $r^1$ and inserted into the transmission sequence 410 prior to the rate change. As shown in FIG. 4, $B_s^{r^1}$ is inserted k number of data blocks 411 prior to the rate change (shown as portion 414), where k is a positive integer. For example, the value k may vary depending on the rate switch and may be determined such that portion 414 comprises a time duration that is sufficient for a receiver, such as the receiver 230, to detect the rate change and to configure the receiver for the updated modulation format.

Figure 5:
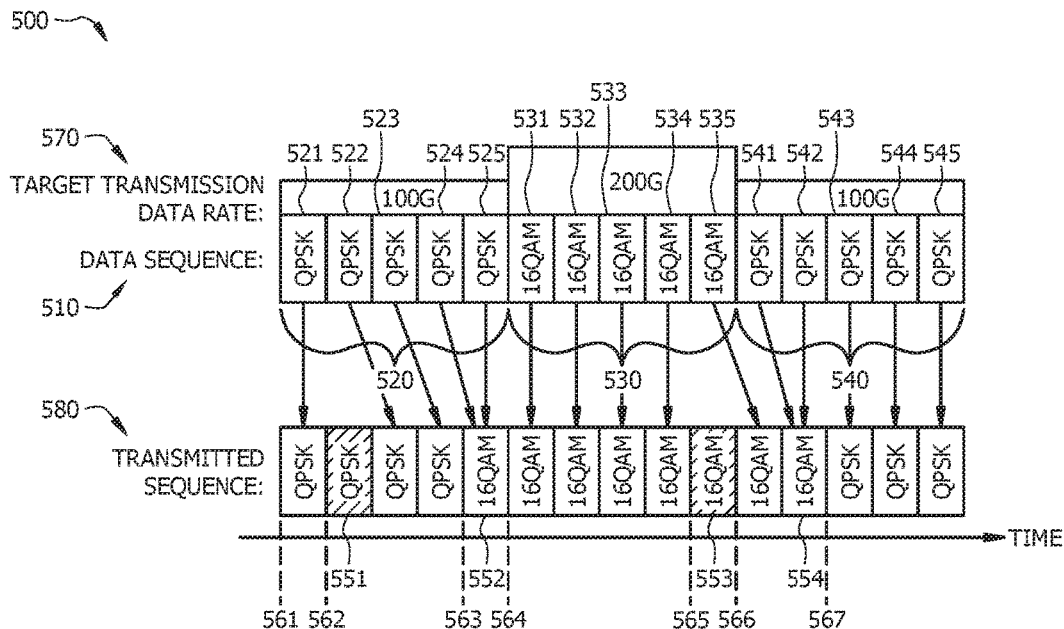
FIG. 5 is a timing diagram of an embodiment of a scheme for providing hitless rate changes.

FIG. 5 is a timing diagram of an embodiment of a scheme 500 for providing hitless rate change, which is employed by an optical transmitter, such as the transmitter 210. The scheme 500 illustrates the encoding of rate change signaling blocks, such as the rate change signaling blocks 413, and the encoding adjustments of data blocks, such as the data blocks 411, 412, or 311, during rate change in order to provide a continuous data transmission and to account for the bandwidth used for the rate change signaling block. In FIG. 5, the x-axis represents time in some arbitrary units and illustrates a target transmission data rate 570, a data sequence 510, and a transmitted sequence 580 over some duration of time. In the scheme 500, the target transmission data rate 570 begins with a first target transmission data rate of about 100 Gbps at time 561, switches to a higher target transmission data rate of about 200 Gbps at time 564, and switches back to the lower target transmission data rate of about 100 Gbps at time 566. For example, the target transmission data rate 570 may be determined based on an input data rate.

As an example, in the scheme 500, the optical transmitter operates at a fixed baud rate and provides different transmission data rates by employing different modulation schemes. To achieve transmission rates of about 100 Gbps and the 200 Gbps, the transmitter employs PM-QPSK and PM-16QAM, respectively. In FIG. 5, the scheme 500 illustrates the rate change mechanisms for one polarization component, for example, an X-polarization component or a Y-polarization component, but similar mechanisms may be applied to the other polarization component.

At time 561, a first portion 520 of a data sequence 510 is partitioned into a plurality of data blocks 521, 522, 523, 524, and 525, similar to the data blocks 411, 412, or 311, for QPSK encoding to provide 100 Gbps transmission data rate. The partitioning of the first portion 520 may be performed by employing similar mechanisms as in the data partitioning scheme 300. After partitioning the first portion 520, the data block 521 is encoded with QPSK and assembled in the transmit sequence 580 for transmission to a receiver, such as the receiver 230.

At time 562, a first rate change signaling block 551, such as the rate change signaling block 413, is inserted into the transmit sequence 580 to indicate the next modulation format, for example, 16QAM, to provide a transmission data rate of about 200 Gbps. The rate change signaling block 551 is encoded with the same modulation format as the data block 521. It should be noted that the rate change signaling block 551 is transmitted prior to the rate change to provide a sufficient amount of time for the receiver to detect the rate change and configure for the updated modulation format. For example, the rate change signaling block 551 may be inserted a pre-determined number of data blocks prior to the rate change, where the number of data blocks may be pre-determined based on a current modulation format and/or a next modulation format.

After transmitting the rate change signaling block 551, the data blocks 522 and 523 are encoded with QPSK and transmitted to the receiver. At time 563, in order to provide a continuous data transmission during the rate change at time 564 and without waiting for the 16QAM data block 531 to begin, the last two data blocks 524 and 525 in the first portion 520 are combined to produce a combined data block and encoded with 16QAM to produce one 16QAM encoded data block 552. The number of data blocks for combining may be dependent on the rate change, for example, a modulation-order ratio between a current format and a next modulation format. As such, by encoding some of the data blocks, such as 524 and 525, in the first portion 520 to the higher upcoming modulation format, the transmitter provides a hitless rate change with continuous data transmission.

At time 564, a second portion 530 of the data sequence 510 is partitioned into a plurality of data blocks 531, 532, 533, 534, and 535, similar to the data blocks 411, 412, or 311, for 16QAM encoding. After partitioning the second portion 530, the data blocks 531-534 are encoded with 16QAM and transmitted to the receiver.

At time 565, a second rate change signaling block 553 is inserted into the transmit sequence 580 to indicate the next modulation format, for example, QPSK, to provide a transmission data rate of about 100 Gbps. The rate change signaling block 553 is encoded with 16QAM, the same modulation format as the data blocks 531-534. Similar to the rate change signaling block 551, the rate change signaling block 553 is transmitted prior to the rate change to provide a sufficient amount of time for the receiver to detect the rate change and configure for the updated modulation format.

At time 566, after transmitting the encoded rate change signaling block 553, the last data block 535 in the second portion 530 is encoded with 16QAM and transmitted to the receiver. At the same time, a third portion 540 of the data sequence 510 is partitioned into a plurality of data blocks 541, 542, 543, 544, and 545, similar to the data blocks 521-525, for QPSK encoding.

In order to provide a continuous data transmission during the rate change at time 566, the first two data blocks 541 and 542 in the third portion 540 are combined and encoded with 16QAM to produce one 16QAM encoded data block 554. The number of data blocks for combining may be dependent on the rate change, for example, a modulation-order ratio between a current modulation format and a next modulation format. At time 567, after adjusting the encoding, the remaining blocks 543-545 in the third portion 530 are encoded with QPSK encoding. It should be noted that the operations described in scheme 500 may be performed in the order as shown or in any other suitable order. For example, a transmitter that employs parallel processing may simultaneously partition current incoming data and encode previous partitioned data.

As shown in the scheme 500, when switching from a low data rate to a high data rate, the data at the end of a data block with the low data rate is encoded to the high modulation format corresponding to the high data rate. Conversely, when switching from a high data rate to a low data rate, the data at the beginning of a data block with the low data rate is encoded to the high modulation format corresponding to the high data rate. In addition, the ratio of low data rate blocks that are encoded to a higher order QAM is about equal to the modulation-order ratio of the higher order QAM to the low order QAM.

Figure 6:
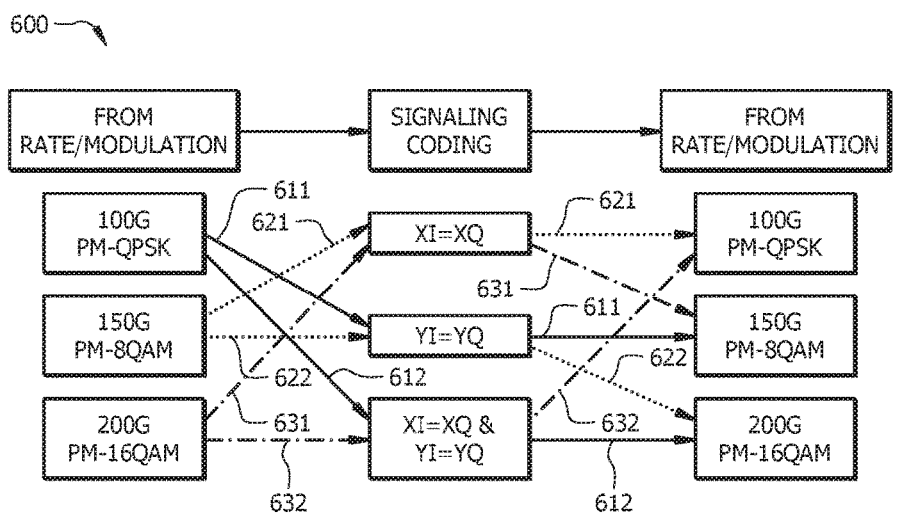
FIG. 6 is a schematic diagram of an embodiment of a coding scheme for rate change signaling.

FIG. 6 is a schematic diagram of an embodiment of a coding scheme 600 for rate change signaling. The coding scheme 600 is employed by an optical transmitter, such as the transmitter 210, and an optical receiver, such as the receiver 230, in a multi-rate optical transceiver. In a PM-QAM system, data bits are modulated onto two orthogonal polarizations, an X-polarization component and a Y-polarization component, where each polarization component comprises two orthogonal phase components, an I component and a Q component. For example, in a PM-QAM system, a first data sub-stream may be modulated onto the I component of the X-polarization component, denoted as XI, a second data sub-stream may be modulated onto the Q component of the X-polarization component, denoted as XQ, a third data sub-stream may be modulated onto the I component of the Y-polarization component, denoted as YI, and a fourth data sub-stream may be modulated onto the Q component of the Y-polarization component, denoted as YQ. Since the four data sub-streams are independent, the probabilities for XI, XQ, YI, and YQ carrying the same symbol value at any particular time is very low or close to zero.

Thus, the scheme 600 employs redundancy coding of XI, XQ, YI, and YQ to provide a robust coding scheme for encoding rate change signaling information. As shown in FIG. 6, to indicate a rate change from a 100 Gbps PM-QPSK transmission to a 150 Gbps PM-8PSK transmission (shown as solid line 611), the data bits for YI and YQ are set to the same value in a rate change signaling block, such as the rate change signaling block 413. To indicate a rate change from a 100 Gbps PM-QPSK transmission to a 200 Gbps PM-16QAM transmission (shown as solid line 612), the data bits for XI and XQ are set to the same value and the data bits for YI and YQ are set to the same value in a rate change signaling block. To indicate a rate change from a 150 Gbps PM-8QAM transmission to a 100 Gbps PM-QPSK transmission (shown as dotted line 621), the data bits for XI and XQ are set to the same value in a rate change signaling block. To indicate a rate change from a 150 Gbps PM-8QAM transmission to a 200 Gbps PM-16QAM transmission (shown as dotted line 622), the data bits for YI and YQ are set to the same value in a rate change signaling block. To indicate a rate change from a 200 Gbps PM-16QAM transmission to a 150 Gbps PM-8QAM transmission (shown as dotted and dashed line 631), the data bits for XI and XQ are set to the same value in a rate change signaling block. To indicate a rate change from a 200 Gbps PM-16QAM transmission to a 150 Gbps PM-8QAM transmission (shown as dotted and dashed line 632), the data bits for XI and XQ are set to the same value and the data bits for YI and YQ are set to the same value in a rate change signaling block. It should be noted that the scheme 600 may be alternatively configured as determined by a person of ordinary skill in the art to achieve the same functionalities.

Figure 7:
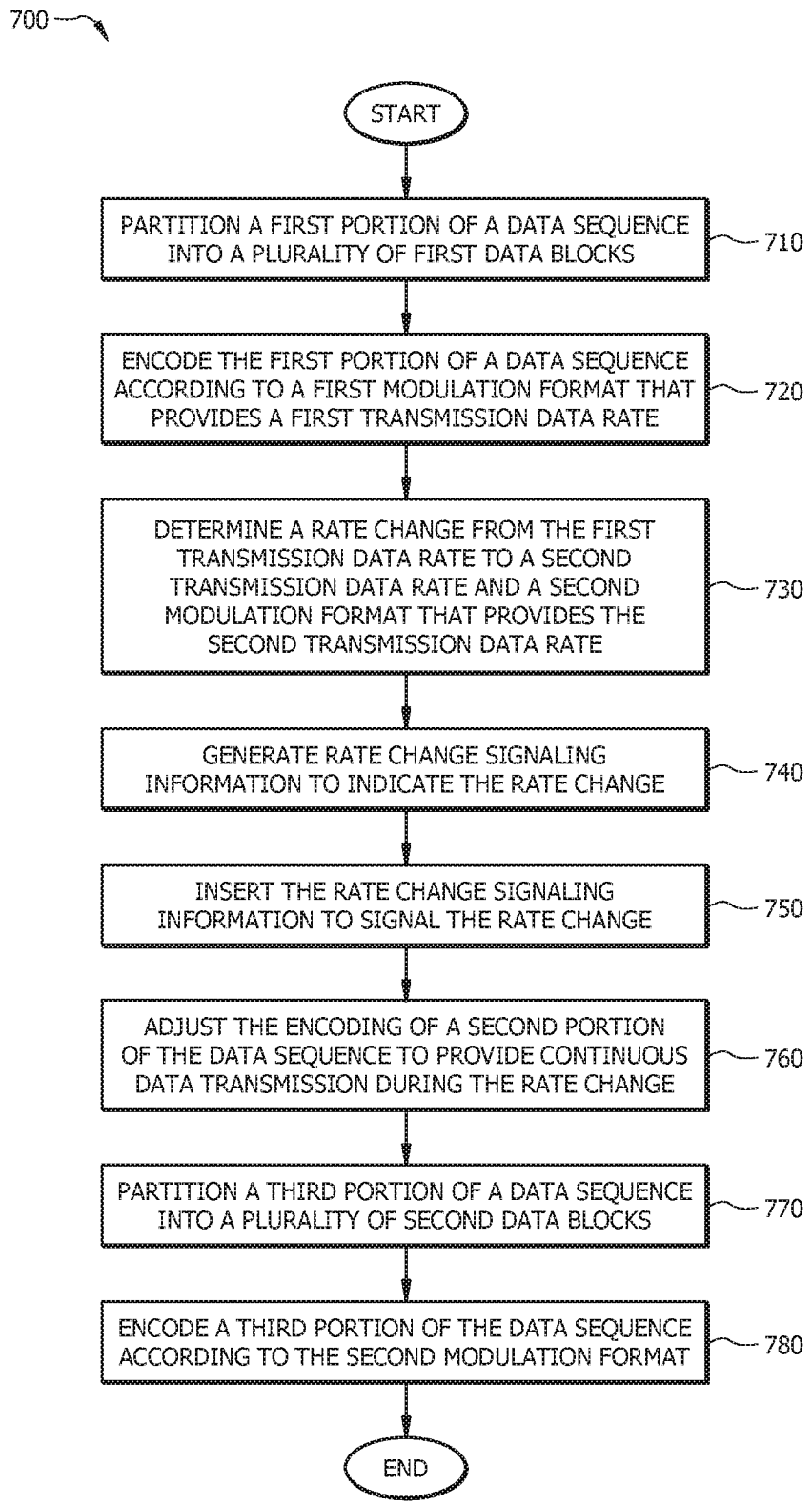
FIG. 7 is a flowchart of an embodiment of a method for generating a multi-rate data stream with rate change signaling information.

FIG. 7 is a flowchart of an embodiment of a method 700 for generating a multi-rate data stream with rate change signaling information. The method 700 is employed by an optical transmitter, such as the transmitter 210, to provide hitless rate changes. The method 700 is similar to the scheme 500. For example, the transmitter may receive an input data sequence that comprises a plurality of portions at different input data rates, for example, from a data generator similar to the data generator 240, and may generate a multi-rate data stream comprising multiple transmission data rates that closely match the input data rates, where different transmission data rates are provided by different modulation formats. At step 710, a first portion of a data sequence is partitioned into a plurality of first data blocks based on the first modulation format and a hardware processing clock speed, for example, by employing a similar mechanism as in the data partitioning scheme 300.

At step 720, the first data blocks in the first portion of the data sequence are encoded according to a first modulation format that provides a first transmission data rate. For example, the first transmission data may be closely matched to the input data rate of the first portion. At step 730, a rate change from the first transmission data rate to a second transmission data rate is determined, for example, based on changes in the input data rate. In order to provide the second transmission data rate, a second modulation format is determined. At step 740, after determining the rate change, rate change signaling information is generated to indicate the rate change, for example, by employing similar mechanisms as in the coding scheme 600.

At step 750, after generating the rate change signaling information, the rate change signaling information is inserted into the multi-rate data stream to signal the rate change. It should be noted that the rate change signaling information is inserted prior to the end of the first data blocks. For example, the transmitter may consider the amount of time required for an optical receiver, such as the receiver 230, to reconfigure the receiver's demodulator and/or the equalizer to switch processing from the first modulation format to the second modulation format. The amount of time may be pre-determined to provide a sufficient amount of time for any modulation format changes and may be in terms of a number of data symbols. For example, when switching from PM-QSPK to PM-16QAM to increase the transmission data rate, the rate change signaling information may be inserted about 4 data blocks prior to the end of the first portion. Alternatively, when switching from PM-16QAM to PM-QPSK to decrease the transmission data rate, the rate change signaling information may be inserted about 1 data block prior to the end of the first portion.

At step 760, after inserting the rate change signaling information, the encoding of a second portion of the data sequence is adjusted to provide a continuous data transmission during the rate change, where the second portion refers to the remaining first data blocks. The encoding adjustment depends on whether the rate change is to increase the transmission data rate or to decrease the transmission data rate. The encoding adjustment refers to selecting a third modulation format for the encoding of the second portion to be either the first modulation format or the second modulation format. For example, when switching from PM-QPSK to PM-16QAM, the remaining 4 first data blocks after the rate change signaling block are encoded differently, where the first 2 data blocks immediately after the rate change signaling information are continued to be encoded in PM-QPSK and the last 2 first data blocks are combined and encoded in the higher modulation format, PM-16QAM. Alternatively, when switching from PM-16QAM to PM-QPSK, the remaining first data block is continued to be encoded in PM-16QAM, and the encoding adjustment is performed later as described below.

At step 770, a third portion of the data sequence is partitioned into a plurality of second data blocks based on the second modulation format and the hardware processing clock speed, for example, by employing similar mechanisms as described in the data partitioning scheme 300. At step 780, a third portion of the data sequence is encoded according to the second modulation format. However, when switching from a high transmission data rate to a low transmission data rate, the encoding adjustment is performed at the beginning of the third portion. For example, when switching from PM-16QAM to PM-QPSK, the first 2 data blocks in the third portion are combined and encoded in the higher modulation format, PM-16QAM. After the encoding adjustment, the remaining second data blocks are encoded in the second modulation format. It should be noted that method 700 is intended to illustrate the operations for generating a multi-rate data stream, but may be performed in any other suitable order. For example, in parallel processing, a data frame may partition a portion of the data sequence while a modulation encoder may encode another portion of the data sequence.

Figure 8:
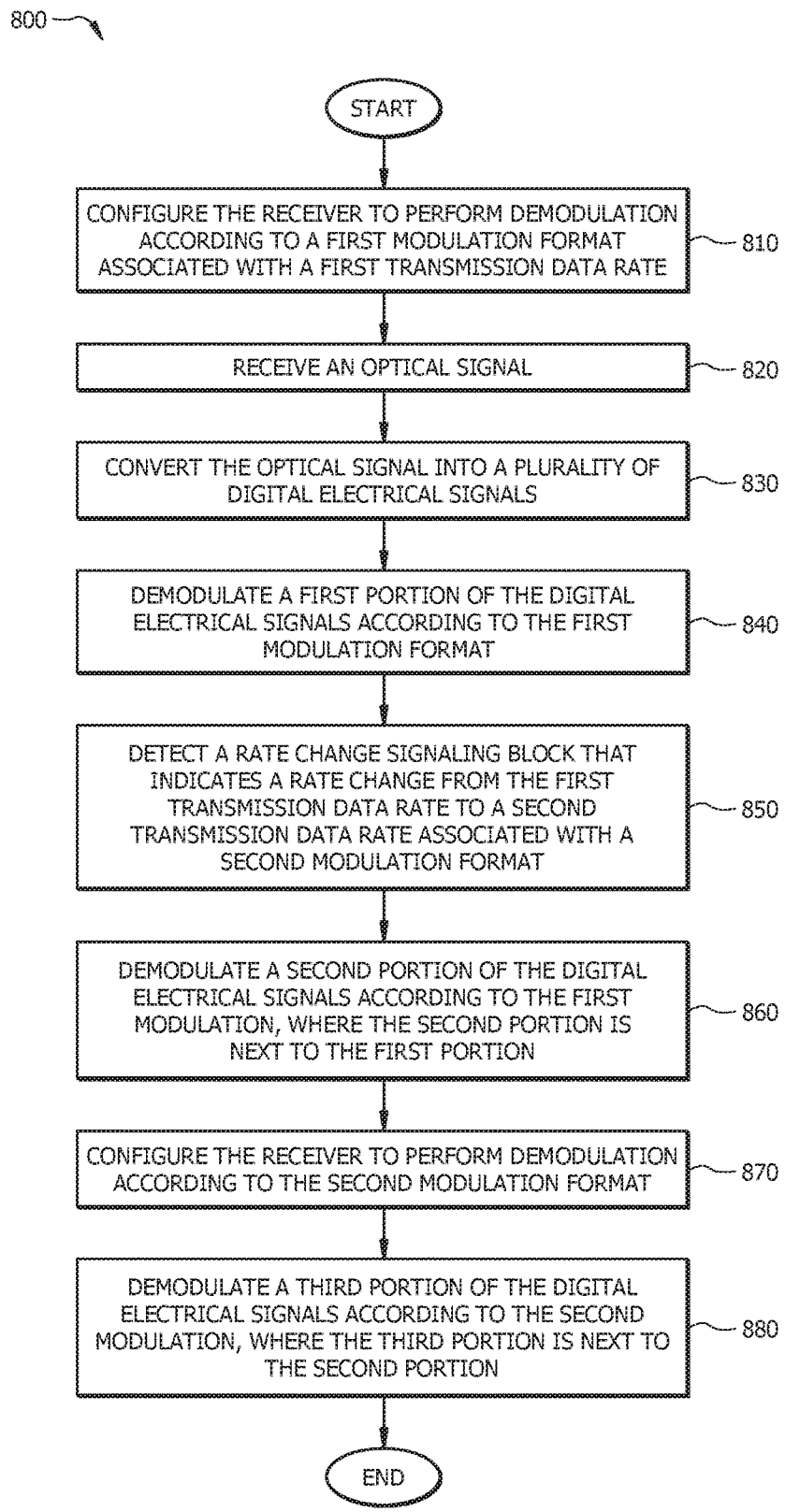
FIG. 8 is a flowchart of an embodiment of a method for processing rate change signaling information.

FIG. 8 is a flowchart of an embodiment of a method 800 for processing rate change signaling information. The method 800 is implemented at an optical receiver, such as the receiver 230. At step 810, the receiver is configured to perform demodulation according to a first modulation format associated with a first transmission data rate. At step 820, an optical signal is received, for example, by the optical receiver. At step 830, the optical signal is converted into a plurality of digital electrical signals. For example, the digital electrical signals may comprise two orthogonal polarization components, an X-polarization component and a Y-polarization component, where the X-polarization component may comprise an I component, XI, and a Q component, XQ, and the Y-polarization component may comprise an I component, YI, and a Q component, YQ. At step 840, a first portion of the digital electrical signals (e.g., a first portion of each XI, XQ, YI, and YQ) is demodulated according to the first modulation format.

At step 850, a rate change signaling block, similar to the rate change signaling block 413, 551, or 553, is detected, where the rate change signaling block is positioned next to the first portion. The rate change signaling block indicates a rate change from the first transmission data rate to a second transmission data rate associated with a second modulation format. The rate change signaling block may be decoded according to a pre-determined rate change signaling coding scheme, such as the coding scheme 600. For example, according to the scheme 600, the rate change signaling block is detected when a value demodulated from XI is equal to a value demodulated from XQ and/or when a value demodulated from YI is equal to a value demodulated from YQ.

At step 860, after receiving the rate change signaling block, a second portion of the digital electrical signals is demodulated according to the first modulation format, where the second portion is positioned next to the rate change signaling block. For example, the second portion may comprise a pre-determined number of samples or symbols and may span a time duration that is sufficient for the receiver to switch to the second modulation format. At step 870, the receiver is configured to perform demodulation according to the second modulation format. At step 880, a third portion of the digital electrical signals are demodulated according to the second modulation format, where the third portion is positioned next to the second portion. It should be noted that the rate change signaling block is discarded after determining the second modulation format.

Figure 9:
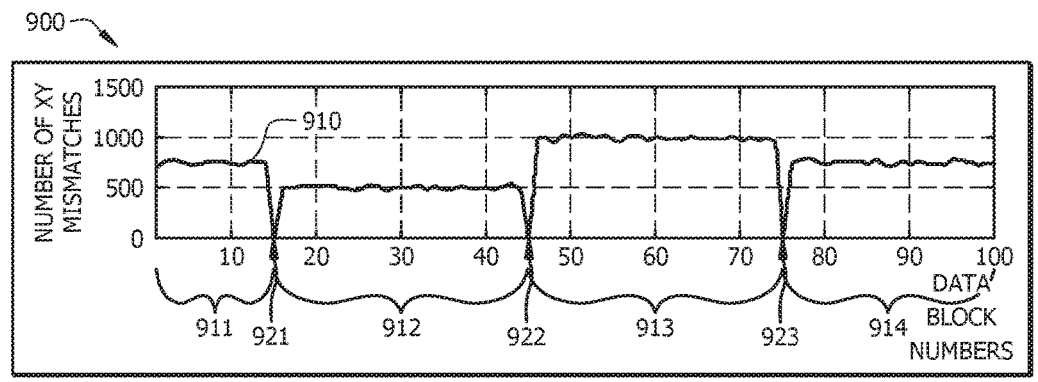
FIG. 9 is a graph showing simulated rate changes for a multi-rate data stream.

FIG. 9 is a graph 900 showing simulated rate changes for a multi-rate data stream. In graph 900, the x-axis represents a data block number, where the data block may be similar to the data block 311, 411, or 412. The y-axis represents a number of mismatches between X values and Y values, where the X values are decoded from an X-polarization component and the Y values are decoded from a Y-polarization component. The simulation includes an optical transmitter, such as the transmitter 210, coupled to an optical coherent receiver, such as the receiver 230, via an optical channel, such as the optical channel 220. In the simulation, the transmitter is configured to transmit a multi-rate data stream that varies among 100 Gbps, 150 Gbps, and 200 Gbps, where the transmitter employs PM-QPSK, PM-8QAM, and PM-16QAM to provide the transmission rates of 100 Gbps, 150 Gbps, and 200 Gbps, respectively. In the simulation, the transmitter changes the transmission data rates in the order of 150 Gbps, 100 Gbps, 200 Gbps, and 150 Gbps and inserts rate change signaling information prior to each rate change. The transmitter encodes four independent data sub-streams, one on each phase component XI, XQ, YI, and YQ and indicates a rate change by setting the values of XI, XQ, YI, and YQ to the same value.

The curve 910 shows the detection of rate changes at the receiver. For example, in the simulation, the receiver is configured to compute a number of mismatches between the X-values and Y-values in a data block, which may include the I and Q components in an X-polarization and a Y-polarization. The portion 911 corresponds to the portion that employs PM-8QAM encoding to achieve the about 150 Gbps transmission data rate. In the portion 911, each symbol carries about 3 data bits and each data block comprises about 500 symbols, thus each data block carries about 1500 data bits. As shown, the number of mismatches between the X-values and the Y-values in the portion 911 is about 750, which corresponds to about 50 percent (%) mismatches as expected. The point 921 at which the number of mismatches between the X-values and the Y-values is about zero corresponds to the reception of the rate change signaling information, which matches with the configuration in the transmitter.

The portion 912 corresponds to the portion that employs PM-QPSK encoding to achieve the about 100 Gbps transmission data rate. In the portion 912, each symbol carries about 2 data bits and each data block comprises about 500 symbols, thus each data block carries about 1000 data bits. As shown, the number of mismatches between the X-values and the Y-values in the portion 912 is about 500, which corresponds to about 50% mismatches as expected. The point 922 at which the number of mismatches between the X-values and the Y-values is about zero corresponds to the reception of the rate change signaling information.

The portion 913 corresponds to the portion that employs PM-16QAM encoding to achieve the about 200 Gbps transmission data rate. In the portion 913, each symbol carries about 4 data bits and each data block comprises about 500 symbols, thus each data block carries about 2000 data bits. As shown, the number of mismatches between the X-values and the Y-values in the portion 913 is about 1000, which corresponds to about 50% mismatches as expected.

The portion 914 corresponds to the portion with PM-8QAM encoding and is similar to the portion 911. The point 923 at which the number of mismatches between the X-values and the Y-values is about zero corresponds to the reception of the rate change signaling information.

Figure 10:
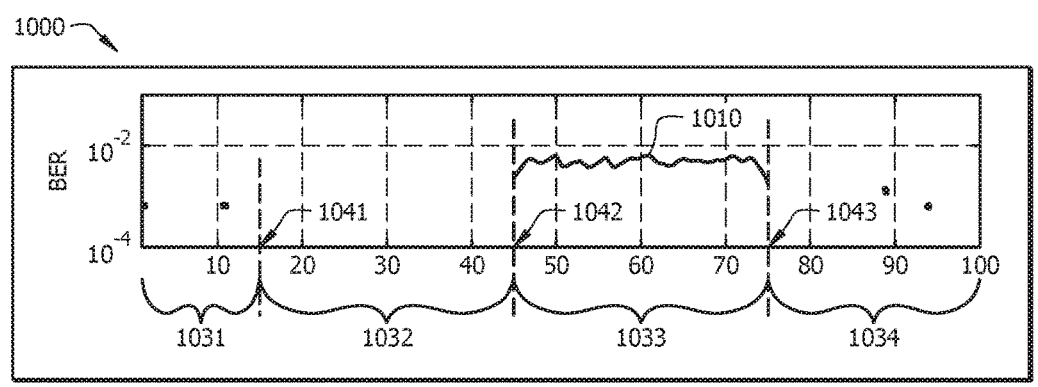
FIG. 10 is a graph of a simulated bit error rate (BER) for a multi-rate data stream.

FIG. 10 is a graph 1000 of a simulated BER for a multi-rate data stream. In the graph 1000, the x-axis provides similar representations as in the x-axis of graph 900 and the y-axis represents BER. The curve 1010 represents BER curve generated from a similar simulation as the simulation described in FIG. 9 and corresponds to the BER measured per data block at the receiver. The region 1031 corresponds to the BERs for the portion 911 with PM-8QAM transmission and the point 1041 corresponds to a first rate change from 150 Gbps to 100 Gbps. The region 1032 corresponds to the BERs for the portion 912 with PM-QPSK transmission and the point 1042 corresponds to a second rate change from 100 Gbps to 200 Gbps. The region 1033 corresponds to the BERs for the portion 913 with PM-16QAM transmission and the point 1043 corresponds to a third rate change from 200 Gbps to 150 Gbps. The portion 1034 corresponds to the BER for the portion 914 with PM-8QAM transmission. As shown in the curve 1010, the relative BERs between the different modulation formats are as expected. It should be noted that the curve 1010 shows no burst errors during the rate change at points 1041, 1042, and 1043.

Figure 11:
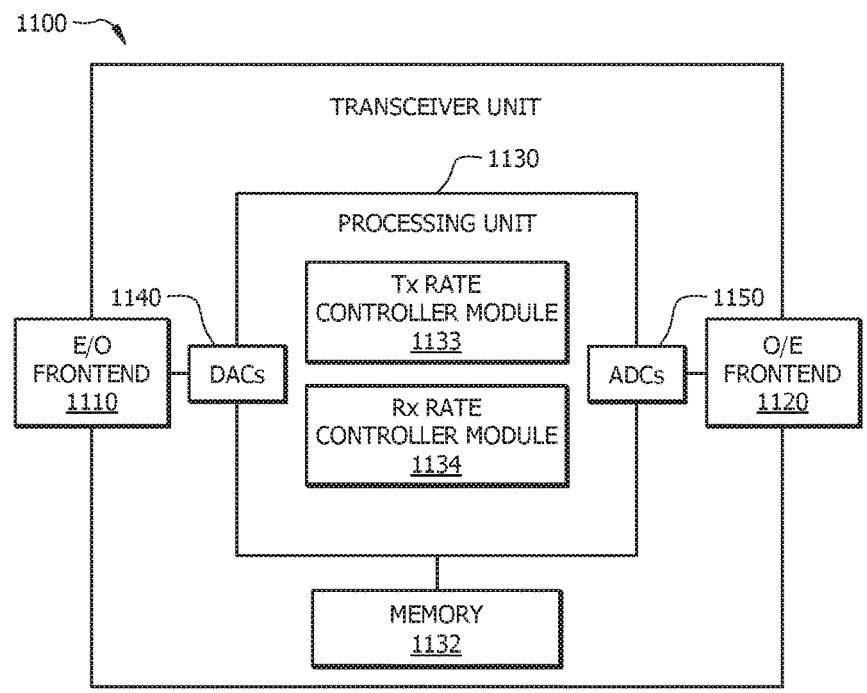
FIG. 11 is a schematic diagram of an embodiment of a transceiver unit.

FIG. 11 is a schematic diagram of an embodiment of a transceiver unit 1100, which may be any device that transmits and/or receives optical signals with encoded data. For example, the transceiver unit 1100 may be located in an optical communication system, such as the optical transportation link 200, which may implement transmitter 210 and the receiver 230. The transceiver unit 1100 may also be configured to implement or support any of the schemes described herein, such as method 700, and/or 800. In some embodiments transceiver unit 1100 may also act as other node(s) in an optical transport network (OTN), such as an optical line terminal (OLT), an optical network unit (ONU), and/or other optical network elements. One skilled in the art will recognize that the term "transceiver unit" encompasses a broad range of devices of which transceiver unit 1100 is merely an example. Transceiver unit 1100 is included for purposes of clarity of discussion, but is in no way meant to limit the application of the present disclosure to a particular transceiver unit embodiment or class of transceiver unit embodiments. At least some of the features and methods described in the disclosure may be implemented in a network apparatus or component such as a transceiver unit 1100. For instance, the features and methods in the disclosure may be implemented using hardware, firmware, and/or software installed to run on hardware. As shown in FIG. 11, the transceiver unit 1100 may comprise an E/O frontend 1110 and/or an O/E frontend 1120, which may convert an electrical signal to an optical signal for transmission in an OTN and/or receive an optical signal from the OTN and convert the optical signal to an electrical signal, respectively. A processing unit 1130 may be coupled to the E/O frontend 1110 and the O/E frontend 1120 via a plurality of DACs 1140 and ADCs 1150, respectively, which may or may not be part of the processing unit 1130. The DACs 1140 may convert digital electrical signals generated by the processing unit 1130 into analog electrical signals that may be fed into the E/O frontend 1110. The ADCs 1050 may convert analog electrical signals received from the O/E frontend 1120 into digital electrical signals that may be processed by the processing unit 1130. The processing unit 1130 may comprise one or more processors, which may include general processors, single-core processors, multi-core processors, ASICs, and/or DSPs. The processing unit 1130 may comprise a Tx rate controller module 1133, which may be similar to the Tx rate controller 218 and may implement the method 700, and an Rx rate controller module 1134, which may be similar to the Rx rate controller 238 and may implement the method 800. In an alternative embodiment, the Tx rate controller module 1133 and the Rx rate controller module 1134 may be implemented as instructions stored in the memory module 1132, which may be executed by processing unit 1130. The memory module 1132 may comprise a cache for temporarily storing content, e.g., a random-access memory (RAM). Additionally, the memory module 1132 may comprise a long-term storage for storing content relatively longer, e.g., a read-only memory (ROM). For instance, the cache and the long-term storage may include dynamic RAMs (DRAMs), solid-state drives (SSDs), hard disks, or combinations thereof.

It is understood that by programming and/or loading executable instructions onto the transceiver unit 1100, at least one of the processing unit 1130 and/or memory module 1132 are changed, transforming the transceiver unit 1100 in part into a particular machine or apparatus, e.g., a multi-core forwarding architecture, having the novel functionality taught by the present disclosure. It is fundamental to the electrical engineering and software engineering arts that functionality that can be implemented by loading executable software into a computer can be converted to a hardware implementation by well-known design rules. Decisions between implementing a concept in software versus hardware typically hinge on considerations of stability of the design, numbers of units to be produced, and/or clock speed requirements rather than any issues involved in translating from the software domain to the hardware domain. Generally, a design that is still subject to frequent change may be preferred to be implemented in software, because re-spinning a hardware implementation is more expensive than re-spinning a software design. Generally, a design that is stable that will be produced in large volume may be preferred to be implemented in hardware, for example in an ASIC, because for large production runs the hardware implementation may be less expensive than the software implementation. Often a design may be developed and tested in a software form and later transformed, by well-known design rules, to an equivalent hardware implementation in an ASIC that hardwires the instructions of the software. In the same manner as a machine controlled by a new ASIC is a particular machine or apparatus, likewise a computer that has been programmed and/or loaded with executable instructions may be viewed as a particular machine or apparatus.

It should be understood that any processing of the present disclosure may be implemented by causing a processor (e.g., a general purpose central processing unit (CPU) inside a computer system) in a computer system (e.g., the transmitter 210 or the receiver 230) to execute a computer program. In this case, a computer program product can be provided to a computer or a mobile device using any type of non-transitory computer readable media. The computer program product may be stored in a non-transitory computer readable medium in the computer or the network device. Non-transitory computer readable media include any type of tangible storage media. Examples of non-transitory computer readable media include magnetic storage media (such as floppy disks, magnetic tapes, hard disk drives, etc.), optical magnetic storage media (e.g., magneto-optical disks), compact disc read-only memory (CD-ROM), compact disc recordable (CD-R), compact disc rewritable (CD-R/W), digital versatile disc (DVD), Blu-ray (registered trademark) disc (BD), and semiconductor memories (such as mask ROM, programmable ROM (PROM), erasable PROM), flash ROM, and RAM). The computer program product may also be provided to a computer or a network device using any type of transitory computer readable media. Examples of transitory computer readable media include electric signals, optical signals, and electromagnetic waves. Transitory computer readable media can provide the program to a computer via a wired communication line (e.g., electric wires, and optical fibers) or a wireless communication line.

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

What is claimed is:

1. A coherent optical receiver comprising:
a frontend configured to:
receive an optical signal that carries a multi-rate data signal associated with a first transmission data rate and a second transmission data rate; and convert the optical signal into a plurality of digital electrical signals; and a processor coupled to the frontend and configured to:
decode a first portion of the digital electrical signals according to a first modulation format associated with the first transmission data rate;
detect a rate change signaling block in the digital electrical signals that indicates a rate change from the first transmission data rate to the second transmission data rate associated with a second modulation format, wherein the rate change signaling block is inserted a pre-determined number of data blocks prior to the rate change based on the rate change from the first transmission data rate to the second transmission data rate; and
decode a second portion of the digital electrical signals received after the rate change signaling block according to the second modulation format.

2. The coherent optical receiver of claim 1, wherein the processor is further configured to decode a third portion of the digital electrical signals received immediately after the rate change signaling block according to the first modulation format.

3. The coherent optical receiver of claim 1, wherein the processor is further configured to discard the rate change signaling block.

4. The coherent optical receiver of claim 1, wherein the processor is further configured to produce a decoded data stream based on the first portion and the second portion.

5. The coherent optical receiver of claim 1, wherein the rate change signaling block comprises a first polarization component and a second polarization component orthogonal to the first polarization component.

6. The coherent optical receiver of claim 5, wherein the first polarization component comprises a first in-phase (I) component and a first quadrature-phase (Q) component, and wherein the first I component and the first Q component comprise a same value.

7. The coherent optical receiver of claim 1, wherein the pre-determined number of data blocks is a number of first data blocks prior to an end of the first portion to provide a demodulation switching time, and wherein the number of first data blocks is dependent on the first modulation format.

8. An apparatus comprising:
a receiver configured to receive an optical signal that carries a multi-rate data signal associated with a first transmission data rate and a second transmission data rate; and
a processor coupled to the receiver and configured to:
convert the optical signal into a plurality of digital electrical signals;
decode a first portion of the digital electrical signals according to a first modulation format associated with the first transmission data rate;
detect a rate change signaling block in the digital electrical signals that indicates a rate change from the first transmission data rate to the second transmission data rate associated with a second modulation format, wherein the rate change signaling block is inserted a pre-determined number of data blocks prior to the rate change based on the rate change from the first transmission data rate to the second transmission data rate; and
decode a second portion of the digital electrical signals received after the rate change signaling block according to the second modulation format.

9. The apparatus of claim 8, wherein the rate change signaling block is encoded in the first modulation format.

10. The apparatus of claim 8, wherein the pre-determined number of data blocks is a number of first data blocks prior to an end of the first portion to provide a demodulation switching time.

11. The apparatus of claim 8, wherein the processor is further configured to produce a decoded data stream based on the first portion and the second portion.

12. The apparatus of claim 8, wherein the rate change signaling block comprises a first polarization component and a second polarization component orthogonal to the first polarization component.

13. A method for use in an optical communication device, comprising:
receiving an optical signal that carries a multi-rate data signal associated with a first transmission data rate and a second transmission data rate;
converting the optical signal into a plurality of digital signals;
decoding a first portion of the digital signals according to a first modulation format associated with the first transmission data rate;
detecting a rate change signaling block in the digital signals that indicates a rate change from the first transmission data rate to the second transmission data rate associated with a second modulation format, wherein the rate change signaling block is inserted a pre-determined number of data blocks prior to the rate change based on the rate change from the first transmission data rate to the second transmission data rate; and
decoding a second portion of the digital signals received after the rate change signaling block according to the second modulation format.

14. The method of claim 13, wherein the pre-determined number of data blocks is a number of first data blocks prior to an end of the first portion to provide a demodulation switching time.

15. The method of claim 13, further comprising decoding a third portion of the digital signals received immediately after the rate change signaling block according to the first modulation format.

16. The method of claim 13, further comprising discarding the rate change signaling block.

17. The method of claim 13, further comprising producing a decoded data stream based on the first portion and the second portion.

18. The method of claim 13, wherein the rate change signaling block comprises a first polarization component and a second polarization component orthogonal to the first polarization component.

19. The method of claim 18, wherein the first polarization component comprises a first in-phase (I) component and a first quadrature-phase (Q) component.

20. The method of claim 19, wherein the first I component and the first Q component comprise a same value.

* * * * *